US011712043B2

(12) United States Patent
Hou et al.

(10) Patent No.: US 11,712,043 B2
(45) Date of Patent: Aug. 1, 2023

(54) ASPERGILLUS ORYZAE AGED CHEESE AND PREPARATION METHOD THEREOF

(71) Applicant: BRIGHT DAIRY & FOOD CO., LTD, Shanghai (CN)

(72) Inventors: Jianping Hou, Shanghai (CN); Benheng Guo, Shanghai (CN); Zhenmin Liu, Shanghai (CN); Huaning Yu, Shanghai (CN); Feng Hang, Shanghai (CN); Xin Song, Shanghai (CN); Haibo Mu, Shanghai (CN); Qinbo Wang, Shanghai (CN); Junwei Zhu, Shanghai (CN)

(73) Assignee: BRIGHT DAIRY & FOOD CO., LTD, Shanghai (CN)

( * ) Notice: Subject to any disclaimer, the term of this patent is extended or adjusted under 35 U.S.C. 154(b) by 989 days.

(21) Appl. No.: 15/107,104

(22) PCT Filed: Jul. 2, 2014

(86) PCT No.: PCT/CN2014/081442
§ 371 (c)(1),
(2) Date: Jun. 22, 2016

(87) PCT Pub. No.: WO2015/096445
PCT Pub. Date: Jul. 2, 2015

(65) Prior Publication Data
US 2016/0338369 A1 Nov. 24, 2016

(30) Foreign Application Priority Data
Dec. 25, 2013 (CN) .......................... 201310728029.7

(51) Int. Cl.
*A23C 19/032* (2006.01)
(52) U.S. Cl.
CPC ........ *A23C 19/0326* (2013.01); *A23C 19/032* (2013.01)
(58) Field of Classification Search
CPC .................................................... A23C 19/00
See application file for complete search history.

(56) References Cited

U.S. PATENT DOCUMENTS 6,020,009 A * 2/2000 Wood ..................... A23L 27/26
426/52
2011/0052757 A1 * 3/2011 Savage ..................... A23B 4/22
426/11

FOREIGN PATENT DOCUMENTS

| CN | 1398547 A | | 2/2003 |
| CN | 1638647 A | | 7/2005 |
| CN | 101422198 A | * | 5/2009 |
| CN | 102144673 A | | 8/2011 |
| JP | H04304842 A | | 10/1992 |
| JP | 2009100678 A | * | 5/2009 |
| JP | 2009100678 A | | 5/2009 |

OTHER PUBLICATIONS

Hui, et al Handbook of Food and Beverage Fermentation Technology, 2004, Marcel Dekker, Inc, p. 1-2,79, 251,259-261.*
Penel, et al Beta-Nitropropionic acid production by Aspergillus Oryzae in selelcted high protein and carbohydrate-rich food, Journal of Food Protection ,1990 , vol. 53, No. 4 p. 321-323.*
Slyke "Conditions affecting chemical changes in cheese-ripening", New York Agricultural Experiment Station, 1903, pp. 133-143.*
Zheng, "Texture Profile Analysis of Sliced Cheese in relation to Chemical Composition and Storage temperature" Journal of Chemistry, 2016. vol. 2016, pp. 1-10.*
Hui et al, Handbook of Food and Beverage Fermentation Technology, 2004, Published by Marcel Dekker Inc. pp. 79, 237-238 and 250-261. (Year: 2004).*

* cited by examiner

*Primary Examiner* — Changqing Li
(74) *Attorney, Agent, or Firm* — Bayramoglu Law Offices LLC

(57) ABSTRACT

Disclosed are *Aspergillus oryzae* aged cheese and a preparation method thereof, wherein the preparation method of the *Aspergillus oryzae* cheese comprises the following steps: (1) inoculating raw milk after sterilization with lactic acid bacteria fermentation agent and *Aspergillus oryzae* spore powder, fermenting to a pH value of 6.3-6.5, wherein an additive amount of the *Aspergillus oryzae* spore powder is 0.001‰-0.008‰‰ of a mass of the raw milk; (2) adding rennin and obtaining curd after curding; (3) cutting the curd to obtain curd blocks; and (4) moulding the curd blocks after expelling whey, and performing pickling and maturing after demoulding, wherein 1-7 days are taken for maturing under 20-30° C.; 7-15 days are taken for maturing under 15-20° C.; 10-20 days are taken for continuing maturing under 8-12° C.; and relative humidity of an environment for maturing is 85%-95%.

6 Claims, No Drawings

ASPERGILLUS ORYZAE AGED CHEESE AND PREPARATION METHOD THEREOF

TECHNICAL FIELD

The present invention relates to an *Aspergillus Oryzae* aged cheese and preparation method thereof.

BACKGROUND

Cheese is an ancient and traditional food. Due to the relatively late starting of the research on cheese in China, as well as the lacking of key technology of cheese production with independent intellectual property rights, the nature cheese yields is low and most cheese products rely on import. However, the flavor and mouth feel of the import nature cheese are suited to the dietary habits of foreigners while the flavor and mouth feel are not popular for Chinese people.

Many microorganisms have been applied in traditional Chinese food for thousands of years with abundant microbial resources in China. These microbial fermentation foods are deeply loved by Chinese people on the aspects of flavor and mouth feel. The research and development of the nature cheese suited for Chinese tastes by the widely application of microbial resources in Chinese traditional food become one of the hot topics in the development and research of cheese.

*Aspergillus Oryzae* has been applied in food for a thousand of years. As an important and safe microorganism (GRAS level) approved by the United States Food and Drug Administration, *Aspergillus Oryzae* plays a significant role in the fermentation industry with wide applications in the production of rice wine, soy sauce, bean sauce and medical protein. Because of a large protease system of the *Aspergillus Oryzae*, macromolecular protein can be degraded into peptides and amino acids that are more easily digested and absorbed by these proteases. Due to a long history of the application of *Aspergillus Oryzae* in Chinese food, the flavor of the fermentation food has been suited to the Chinese dietary habits and deeply loved by Chinese people. Therefore the research of *Aspergillus Oryzae* in fermentation food has great advantage in resources.

SUMMARY OF THE INVENTION

The present invention intends to solve the technical problems which are to overcome the defects that the existing cheese mainly depends on importation and the flavor of the imported cheese is not suited to the dietary habits of Chinese consumers. The present invention provides an *Aspergillus Oryzae* aged cheese and preparation method thereof, wherein the *Aspergillus Oryzae* aged cheese prepared by the present invention has unique flavor and high nutritional value; meanwhile, the preparation method of the present invention is simple, short in ripening period and suited for generalization and application.

The present invention solves the technical issues above through the following technical solution.

The method for preparing an *Aspergillus Oryzae* aged cheese of the present invention comprises the following steps:

(1) inoculating raw milk after sterilization with lactic acid bacteria fermentation agent and *Aspergillus Oryzae* spore powder, fermenting to a pH value of 6.3-6.5, wherein an addition amount of the *Aspergillus Oryzae* spore powder is 0.001‰-0.008‰ of a mass of the raw milk;

(2) adding rennet and obtaining curd after curding;

(3) cutting the curd to obtain curd blocks;

(4) moulding the curd blocks after expelling whey, performing pickling and ripening after demoulding, wherein 1-7 days are taken for ripening under 20-30° C.; 7-15 days are taken for ripening under 15-20° C.; 10-20 days are taken for further ripening under 8-12° C.; the relative humidity of an environment for maturing is 85%-95%.

The raw milk in the step (1) is the conventional raw milk in the art, preferably the fresh milk or reconstituted milk according with the specification of National Standard for food. The source of the raw milk is preferably one or more of cow milk, mare milk, goat milk and camel milk.

The method and condition of the sterilization in the step (1) is the conventional method and condition of the sterilization in the art, preferably for pasteurization. The pasteurization temperature is preferably 70° C.-72° C. The pasteurization time is preferably 15 s-60 s. When the sterilization is completed, a process of cooling the sterilized raw milk is preferably performed; the cooling temperature is preferably 28° C.-33° C.

The method and condition of the fermentation in the step (1) is the conventional method and condition of the fermentation in the art. The fermentation is performed preferably at a constant temperature; the fermentation temperature is preferably 28° C.-33° C. The fermentation time is preferably 30 min-150 min to reach a pH value of 6.3-6.5 when the fermentation is completed.

The lactic acid bacteria fermentation agent in the step (1) is the conventional lactic acid bacteria fermentation agent in the art used to prepare cheese. The Lactic acid bacteria in the lactic acid bacteria fermentation agent is preferably one or more of *Lactococcus lactis* subsp. *cremoris, Lactococcus lactis* subsp. *lactis* and *Lactococcus lactis* subsp. *lactis biovar. diacetylactis*. The lactic acid bacteria fermentation agent is preferably one or more of R-704 fermentation agent provided by Chr. Hansen A/S, MM100 fermentation agent provided by Danisco Co., Ltd. and LL-50 fermentation agent provided by Royal DSM; the addition amount of the lactic acid bacteria fermentation agent is the conventional amount in the art, preferably 0.6-2.0 g lactic acid bacteria fermentation agent per 100 L raw milk, more preferably 1.0-1.5 g lactic acid bacteria fermentation agent per 100 L raw milk.

The *Aspergillus Oryzae* spore powder in the step (1) may be the conventional *Aspergillus Oryzae* spore powder in the field of food processing. The addition amount of the *Aspergillus Oryzae* spore powder is preferably 0.002‰-0.006‰ of a mass of the raw milk, more preferably of 0.003‰-0.005‰, wherein the permillage is the mass of *Aspergillus Oryzae* spore powder to the mass of raw milk. The *Aspergillus Oryzae* spore powder may be added in the form of the conventional adding form in the art, preferably in the form of *Aspergillus Oryzae* spore powder solution. The preparation method and condition of the *Aspergillus Oryzae* spore powder solution is the conventional method and condition in the art, preferably comprising the following step: dispersing the *Aspergillus Oryzae* spore powder in sterile water, wherein the *Aspergillus Oryzae* spore powder is preferably 0.1%-5% of a mass of the sterile water.

The rennet in the step (2) is the conventional rennet in the art, preferably calf rennet and/or microbial rennet. The addition amount of the rennet is the conventional amount in the art, preferably 1.0 g-2.0 g rennet per 100 L raw milk, more preferably 1.2 g-1.8 g rennet per 100 L raw milk. The curding time is the conventional time in the art, preferably for 30-60 min.

The method and condition of the cutting in the step (3) may be the conventional method and condition in the art, preferably cutting the curd to curd blocks with a steel wire cutter, wherein the spacing of the cutter edges is 10 mm-30 mm in the present invention.

The method and condition of the pickling in the step (4) is the conventional method and condition in the art. The pickling in the present invention comprises the following step: pickling the curd blocks in sodium chloride aqueous solution with a mass concentration of 15%-20%, wherein the percentage is the mass of sodium chloride to the total mass of sodium chloride aqueous solution. The sodium chloride aqueous solution in the present invention is usually salt solution. The end of the pickling is the penetration of the sodium chloride into the cheese; the content of the sodium chloride in the curd blocks is preferably 0.3%-3%, more preferably 0.6%-1.5%, wherein the percentage is the mass of sodium chloride to the total mass of curd blocks. The pickling time is usually 10-12 hours.

The objective of the ripening in the step (4) is to grow the *Aspergillus Oryzae* better to ripen cheese. The conditions of ripening are preferably ripening for 1-7 days under 20-30° C., ripening for 7-15 days under 15-20° C., further ripening for 10-20 days under 8-12° C., wherein the relative humidity of the environment for ripening is 90%-93%.

The present invention further provides an *Aspergillus Oryzae* aged cheese prepared by the afore-mentioned method.

Each preferred condition described above may be arbitrary combined to obtain each preferred embodiment of the present invention on a basis of compliance with common knowledge in this field.

The reagents and the raw materials employed in the present invention are available commercially.

The effects of the positive progress of the present invention are:

The *Aspergillus Oryzae* aged cheese prepared by the preparation method of the present invention fills in the blank of the research field of nature cheese at home and abroad; the flavor and mouth feel of the prepared *Aspergillus Oryzae* aged cheese is further suited to the dietary habit of Chinese people; meanwhile, the preparation method of the present invention is simple, short in ripening period and suited for generalization and application.

DETAIL DESCRIPTION OF THE INVENTION

Hereinafter, the present invention is to be described in further detail by using examples; however the present invention is not limited in the scope of these embodiments. The experimental methods without specific conditions in the following embodiments are selected in accordance with the conventional processes and conditions or the product instructions.

If not especially stated, the reagents or the raw materials employed are available commercially. If not especially stated, the percentage is the mass percentage and the permillage is the mass permillage.

Lactic acid bacteria fermentation agent: R-704 fermentation agent provided by Chr. Hansen A/S, MM100 fermentation agent provided by Danisco Co. Ltd. and LL-50 fermentation agent provided by Royal DSM;

*Aspergillus Oryzae* spore powder: Shanghai HuiLing Enzyme Products Co., Ltd.;

Rennet: product (Fromase 750XLG) of Chr. Hansen A/S;

*Geotrichum candidum*: product (GEO 17) of Danisco Co., Ltd.

Embodiment 1

(1) sterilizing 100 L fresh cow milk for 15 s at the temperature of 72° C., cooling to 30° C., inoculating 2 g R-704 fermentation agent and 0.002‰ *Aspergillus Oryzae* spore powder, fermenting to a pH value of 6.5 for 100 min at the temperature of 30° C.;

(2) adding 1.2 g calf rennet and obtaining curd after 50 min curding;

(3) cutting the curd to obtain curd blocks with a steel wire cutter, wherein the spacing of the cutter edges is 10 mm-30 mm;

(4) moulding the curd blocks after expelling whey, performing pickling for 12 hours in sodium chloride aqueous solution with a mass concentration of 15% and ripening after demoulding, the content of the sodium chloride in the curd blocks is 0.6%; wherein 5 days are taken for ripening at 25° C.; 7 days are taken for ripening at 20° C.; 15 days are taken for further ripening at 8° C.; the relative humidity of an environment for maturing is 95%.

The *Aspergillus Oryzae* aged cheese of this embodiment obtained by the above method has delicate mouth feel and mild flavor.

Embodiment 2

(1) sterilizing 100 L fresh cow milk for 15 s at the temperature of 72° C., cooling to 30° C., inoculating 2 g R-704 fermentation agent and 0.004‰ *Aspergillus Oryzae* spore powder, fermenting to a pH value of 6.4 for 60 min at the temperature of 30° C.;

(2) adding 1.2 g calf rennet and obtaining curd after 50 min curding;

(3) cutting the curd to obtain curd blocks with a steel wire cutter, wherein the spacing of the cutter edges is 10 mm-30 mm;

(4) moulding the curd blocks after expelling whey, performing pickling for 12 hours in sodium chloride aqueous solution with a mass concentration of 18% and ripening after demoulding, the content of the sodium chloride in the curd blocks is 1.0%; wherein 1 days are taken for ripening at 25° C.; 15 days are taken for ripening at 20° C.; 10 days are taken for further ripening at 8° C.; the relative humidity of an environment for maturing is 85%.

The *Aspergillus Oryzae* aged cheese of this embodiment obtained by the above method has delicate mouth feel and mild flavor.

Embodiment 3

(1) sterilizing 100 L fresh cow milk for 15 s at the temperature of 72° C., cooling to 30° C., inoculating 2 g R-704 fermentation agent and 0.006‰ *Aspergillus Oryzae* spore powder, fermenting to a pH value of 6.3 for 30 min at the temperature of 30° C.;

(2) adding 1.2 g calf rennet and obtaining curd after 50 min curding;

(3) cutting the curd to obtain curd blocks with a steel wire cutter, wherein the spacing of the cutter edges is 10 mm-30 mm;

(4) moulding the curd blocks after expelling whey, performing pickling for 10 hours in sodium chloride aqueous solution with a mass concentration of 20% and ripening after demoulding, the content of the sodium chloride in the curd blocks is 1.5%; wherein 5 days are taken for ripening at 25° C.; 5 days are taken for ripening at 20° C.; 15 days are taken for further ripening at 8° C.; the relative humidity of an environment for maturing is 90%.

The *Aspergillus Oryzae* aged cheese of this embodiment obtained by the above method has delicate mouth feel and mild flavor.

Embodiment 4

(1) sterilizing 100 L fresh cow milk for 60 s at the temperature of 70° C., cooling to 28° C., inoculating 0.6 g MM100 fermentation agent and 0.004‰ *Aspergillus Oryzae* spore powder, fermenting to a pH value of 6.5 for 150 min at the temperature of 28° C.;

(2) adding 1.0 g microbial rennet and obtaining curd after 30 min curding;

(3) cutting the curd to obtain curd blocks with a steel wire cutter, wherein the spacing of the cutter edges is 10 mm-30 mm;

(4) moulding the curd blocks after expelling whey, performing pickling for 10 hours in sodium chloride aqueous solution with a mass concentration of 15% and ripening after demoulding, the content of the sodium chloride in the curd blocks is 0.3%; wherein 5 days are taken for ripening at 20° C.; 15 days are taken for ripening at 15° C.; 10 days are taken for further ripening at 12° C.; the relative humidity of an environment for maturing is 93%.

The *Aspergillus Oryzae* aged cheese of this embodiment obtained by the above method has delicate mouth feel and mild flavor.

Embodiment 5

(1) sterilizing 100 L fresh cow milk for 60 s at the temperature of 70° C., cooling to 33° C., inoculating 1.5 g R-704 fermentation agent and 0.1% *Aspergillus Oryzae* spore powder solution (wherein the used amount of the *Aspergillus Oryzae* spore powder is 0.006‰ of a mass of the raw milk), fermenting to a pH value of 6.3 for 60 min at the temperature of 33° C.;

(2) adding 1.8 g microbial rennet and obtaining curd after 30 min curding;

(3) cutting the curd to obtain curd blocks with a steel wire cutter, wherein the spacing of the cutter edges is 10 mm-30 mm;

(4) moulding the curd blocks after expelling whey, performing pickling for 10 hours in sodium chloride aqueous solution with a mass concentration of 20% and ripening after demoulding, the content of the sodium chloride in the curd blocks is 1.5%; wherein 7 days are taken for ripening at 30° C.; 7 days are taken for ripening at 20° C.; 20 days are taken for further ripening at 10° C.; the relative humidity of an environment for maturing is 90%.

The *Aspergillus Oryzae* aged cheese of this embodiment obtained by the above method has delicate mouth feel and mild flavor.

Comparison Embodiment 1

The remaining process steps are kept as in embodiment 1 except replacing the *Aspergillus Oryzae* with *Geotrichum Candidum* Link & Magazin. to obtain the *Geotrichum candidum* aged cheese as comparison embodiment 1.

Comparison Embodiment 2

The remaining process steps are kept as in embodiment 1 except that the amount of the *Aspergillus Oryzae* spore powder is changed from 0.002‰ to 0.01‰ of a mass of the raw milk to obtain the cheese as comparison embodiment 2.

Comparison Embodiment 3

The remaining process steps are kept as in embodiment 1 except that the step of fermenting to a pH value of 6.5 is changed to fermenting to a pH value of 5.8 to obtain the cheese as comparison embodiment 3.

Comparison Embodiment 4

The remaining process steps are kept as in embodiment 1 except that 20 days are taken for ripening at 20° C. to obtain the cheese as comparison embodiment 4.

The sensory evaluation standard of cheese is formulated comprehensively by GB25192-2010 and GB5420-2010 standards as shown in Table 1. Evaluating the sensory of the *Aspergillus Oryzae* aged cheese prepared by embodiment 1-5 and the cheese prepared by the comparison embodiment 1-4 based on the standard of Table 1 and recording the statistical result in Table 2.

TABLE 1

The sensory evaluation standard of cheese

| Projects | Characteristics |
|---|---|
| Texture | Uniform texture, proper hardness and softness, exquisite tissue and plastic quality (0-20 points) |
| Appearance | Uniform color, smooth, soft and glossy (0-30 points) |
| Flavor | Specific taste and flavor of the cheese, odor free (0-20 points) |
| Mouth feel | Moderate chewiness, mild milk aroma (0-30 points) |

TABLE 2

The sensory evaluation result of the embodiments and the comparison embodiments

| Projects | Appearance | Texture | Flavor | Mouth feel | Total value |
|---|---|---|---|---|---|
| Embodiment 1 | 17.97 ± 0.18 | 24.92 ± 1.31 | 18.87 ± 0.11 | 27.97 ± 0.13 | 88.45 ± 1.15 |
| Embodiment 2 | 18.71 ± 0.75 | 24.35 ± 0.35 | 18.24 ± 0.40 | 27.90 ± 0.44 | 88.91 ± 2.60 |
| Embodiment 3 | 18.58 ± 0.15 | 25.80 ± 0.11 | 18.36 ± 0.72 | 27.94 ± 0.30 | 90.58 ± 0.94 |

TABLE 2-continued

The sensory evaluation result of the embodiments and the comparison embodiments

| Projects | Appearance | Texture | Flavor | Mouth feel | Total value |
|---|---|---|---|---|---|
| Embodiment 4 | 18.71 ± 0.70 | 25.80 ± 0.15 | 18.24 ± 0.45 | 27.90 ± 0.40 | 88.45 ± 1.10 |
| Embodiment 5 | 18.56 ± 0.15 | 25.85 ± 0.12 | 18.40 ± 0.70 | 27.90 ± 0.30 | 90.60 ± 0.90 |
| Comparison embodiment 1 | 17.92 ± 0.56 | 24.60 ± 0.16 | 16.13 ± 0.97 | 26.71 ± 0.98 | 85.99 ± 1.86 |
| Comparison embodiment 2 | 18.01 ± 0.95 | 24.03 ± 0.32 | 15.55 ± 0.63 | 24.64 ± 1.05 | 85.69 ± 2.01 |
| Comparison embodiment 3 | 17.86 ± 0.53 | 23.74 ± 1.80 | 17.75 ± 0.49 | 25.50 ± 0.76 | 86.76 ± 1.60 |
| Comparison embodiment 4 | 17.80 ± 0.50 | 23.60 ± 1.50 | 17.80 ± 0.65 | 25.45 ± 0.67 | 86.66 ± 1.80 |

Compared the *Aspergillus Oryzae* aged cheese prepared by embodiment 1-5 with the *Geotrichum candidum* aged cheese prepared by the comparison embodiment 1 based on the result of the sensory evaluation, the texture is not significantly different and the appearance is not different either, however the points of the *Aspergillus Oryzae* aged cheese are higher than the *Geotrichum candidum* aged cheese prepared by the comparison embodiment 1 on the flavor aspect. It is possible that the *Aspergillus Oryzae* aged cheese of the present invention breaks the view people hold toward to the traditional aged cheese; the flavor of the *Aspergillus Oryzae* aged cheese is similar to the traditional fermenting food with *Aspergillus Oryzae* in China; the *Aspergillus Oryzae* aged cheese is easy to be accepted by Chinese consumer with higher flavor and mouth feel.

In the comparison embodiment 2, when the additive amount of the *Aspergillus Oryzae* spore powder is excessive, the flavor is too strong and the mouth feel is bad, however the appearance is almost same compared with the embodiments.

The points of the cheese prepared by the comparison embodiment 3 are lower than the *Aspergillus Oryzae* aged cheese of the embodiment 1-5 on the aspects of texture and mouth feel because of the low fermentation acidity.

The controlling of temperature and time has high remarkable effect on the aspect of cheese structure in the ripening of the *Aspergillus Oryzae* cheese in the comparison embodiment 4, which lead to that the overall score of the cheese prepared by the comparison embodiment 4 is lower than the *Aspergillus Oryzae* aged cheese of the embodiment 1-5.

Therefore *Aspergillus Oryzae* aged cheese may compares favorably with the traditional *Candidum* Link & Magazin cheese with a good commercial application prospects.

Although specific embodiments of the present invention have been described above, however, it will be understood by those skilled in the art that this is for purposes of example only. Many variations and modifications of these embodiments may be made without departing from the principle or essence of the present invention. Therefore, the scope of the present invention is to be limited by the terms of the appended claims.

What is claimed is:

1. A method for preparing an *Aspergillus oryzae* aged cheese, comprising the following steps:
   S1: inoculating raw milk after sterilization with lactic acid bacteria fermentation agent and *Aspergillus oryzae* spore powder, fermenting to a pH value of 6.5
   S2: adding 1.2 g per 100 L raw milk of calf rennet and obtaining curd after curding for 50 minutes;
   S3: cutting the curd to obtain curd blocks; and
   S4: moulding the curd blocks after expelling whey, performing pickling for 12 hours in a sodium chloride aqueous solution with a mass concentration of 15% and ripening after demoulding, wherein 5 days are taken for ripening under 25° C.; 7 days are taken for ripening under 20° C.; 15 days are taken for further ripening under 8° C.; the relative humidity of an environment for maturing is 95%,
   wherein a lactic acid bacteria in the lactic acid bacteria fermentation agent in the step S1 is one or more selected from the group consisting of *Lactococcus lactis* subsp. *cremoris*, *Lactococcus lactis* subsp. *lactis* and *Lactococcus lactis* subsp. *lactis biovar. diacetylactis*,
   an addition amount of the lactic acid bacteria fermentation agent is 2.0 g per 100 L raw milk,
   an addition amount of the *Aspergillus oryzae* spore powder in the step S1 is 0.002‰ of the mass of the raw milk.

2. The method according to claim 1, wherein the raw milk in the step S1 is fresh milk or reconstituted milk; the source of the raw milk is one or more of cow milk, mare milk, goat milk and camel milk; the sterilization is pasteurization; the pasteurization temperature is 70° C.-72° C.; the pasteurization time is 15 s-60 s; the fermentation temperature is 28° C.-33° C.; the fermentation time is 30 min-150 min;
   and/or, when the sterilization is completed, a process of cooling the sterilized raw milk is performed; the cooling temperature is 28° C.-33° C.

3. The method according to claim 1, wherein the *Aspergillus oryzae* spore powder in the step S1 is added as an *Aspergillus oryzae* spore powder solution; a preparation method of the *Aspergillus oryzae* spore powder solution comprising the following step: dispersing the *Aspergillus oryzae* spore powder in sterile water, wherein the *Aspergillus oryzae* spore powder is 0.1%-5% of the mass of the sterile water.

4. The method according to claim 1, wherein
   the cutting in the step S3 is cutting the curd to curd blocks with steel wire cutters, wherein the spacing of the cutter edges is 10 mm-30 mm.

5. The method according to claim 1, wherein after the pickling, a content of the sodium chloride in the curd blocks is 0.6%-1.5%.

6. An *Aspergillus oryzae* aged cheese prepared by the method according to claim 1.

* * * * *